US008861187B2

(12) United States Patent
Takahashi

(10) Patent No.: US 8,861,187 B2
(45) Date of Patent: Oct. 14, 2014

(54) CONVERTIBLE TABLET

(75) Inventor: Tomoyuki Takahashi, Kanagawa-Ken (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 330 days.

(21) Appl. No.: 13/330,424

(22) Filed: Dec. 19, 2011

(65) Prior Publication Data

US 2013/0155592 A1 Jun. 20, 2013

(51) Int. Cl.
*H05K 7/00* (2006.01)

(52) U.S. Cl.
USPC ............ 361/679.06; 361/679.07; 361/679.27; 361/679.18

(58) Field of Classification Search
USPC .............. 361/679.18, 679.07, 679.06, 679.27
See application file for complete search history.

(56) References Cited

U.S. PATENT DOCUMENTS

| 5,016,849 | A | * | 5/1991 | Wu | 248/176.3 |
|---|---|---|---|---|---|
| 5,973,915 | A | * | 10/1999 | Evans | 361/679.23 |
| 6,275,376 | B1 | | 8/2001 | Moon | |
| 6,510,049 | B2 | * | 1/2003 | Rosen | 361/679.07 |
| 6,742,221 | B2 | * | 6/2004 | Lu et al. | 16/367 |
| 6,867,961 | B2 | | 3/2005 | Choi | |
| 7,027,297 | B1 | | 4/2006 | Mizuno et al. | |
| 7,100,876 | B2 | * | 9/2006 | Tseng et al. | 248/125.9 |
| 7,129,931 | B2 | * | 10/2006 | Pappas | 345/168 |
| 7,187,364 | B2 | * | 3/2007 | Duarte et al. | 345/168 |
| 7,191,492 | B2 | * | 3/2007 | Yang | 16/374 |
| 7,345,871 | B2 | * | 3/2008 | Lev et al. | 361/679.27 |
| 7,375,956 | B2 | * | 5/2008 | Chuang et al. | 361/679.55 |
| 7,434,774 | B1 | * | 10/2008 | Floersch et al. | 248/183.2 |
| 7,551,431 | B2 | * | 6/2009 | Nakajima | 361/679.06 |
| 7,581,291 | B2 | * | 9/2009 | Abe et al. | 16/367 |
| 7,652,873 | B2 | * | 1/2010 | Lee | 361/679.06 |
| 7,656,661 | B2 | * | 2/2010 | Shaum | 361/679.55 |
| 7,706,137 | B2 | * | 4/2010 | Iijima et al. | 361/679.07 |
| 7,800,893 | B2 | * | 9/2010 | Tracy et al. | 361/679.27 |
| 7,832,055 | B2 | * | 11/2010 | Schoolcraft et al. | 16/347 |
| 7,970,444 | B2 | * | 6/2011 | Thornton et al. | 455/575.4 |
| 8,050,018 | B2 | * | 11/2011 | Takizawa | 361/679.06 |
| 8,250,713 | B2 | * | 8/2012 | Lin | 16/367 |
| 8,498,101 | B2 | * | 7/2013 | Chiang et al. | 361/679.22 |
| 8,520,378 | B2 | * | 8/2013 | Kim et al. | 361/679.27 |
| 8,537,529 | B2 | * | 9/2013 | Qiu et al. | 361/679.02 |
| 2004/0090742 | A1 | * | 5/2004 | Son et al. | 361/686 |
| 2005/0207104 | A1 | * | 9/2005 | Love | 361/683 |
| 2006/0133020 | A1 | * | 6/2006 | Huang et al. | 361/683 |
| 2006/0187625 | A1 | * | 8/2006 | Jung et al. | 361/681 |

(Continued)

OTHER PUBLICATIONS

Lenovo, "ThinkPad X series Convertible Tablets", http://www.lenovo.com/products/us/laptop/thinkpad/xtablet-series/index.html, 2011, pp. 1-3.

*Primary Examiner* — Adrian S Wilson
*Assistant Examiner* — Abhishek Rathod
(74) *Attorney, Agent, or Firm* — Shimokaji & Assoc., P.C.

(57) ABSTRACT

A computer system and an attached input unit are provided for a user to input data. A computer system may comprise a linking member, a display housing, and an input unit. The linking member may have a first hinge and a second hinge. The display housing may be pivotally attached to the first hinge of the linking member. The input unit may be attached to the second hinge of the linking member.

4 Claims, 5 Drawing Sheets

(56) References Cited

U.S. PATENT DOCUMENTS

| | | | |
|---|---|---|---|
| 2010/0073857 A1* | 3/2010 | Lin et al. | 361/679.27 |
| 2010/0232102 A1* | 9/2010 | Walker et al. | 361/679.27 |
| 2011/0110027 A1* | 5/2011 | Hu | 361/679.07 |
| 2012/0113578 A1* | 5/2012 | Holung et al. | 361/679.07 |
| 2012/0293938 A1* | 11/2012 | Dai et al. | 361/679.07 |

* cited by examiner

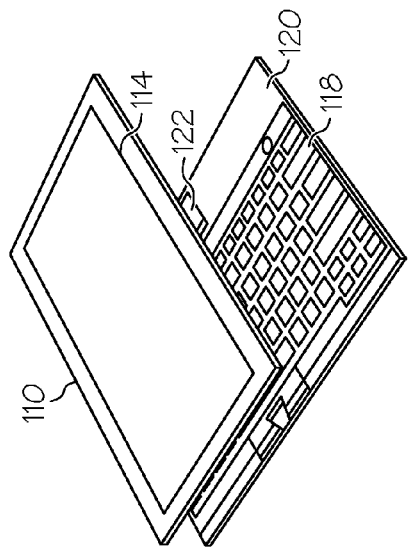
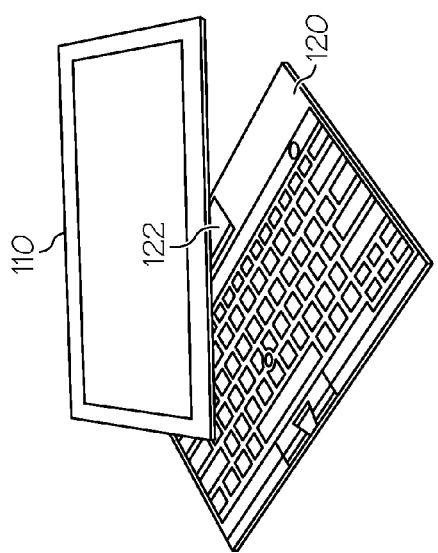
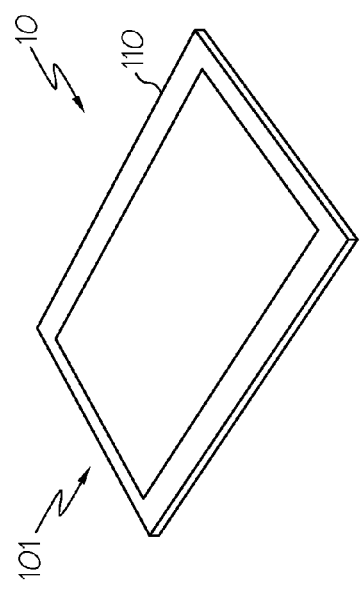
FIG. 1A
FIG. 1B
FIG. 1C

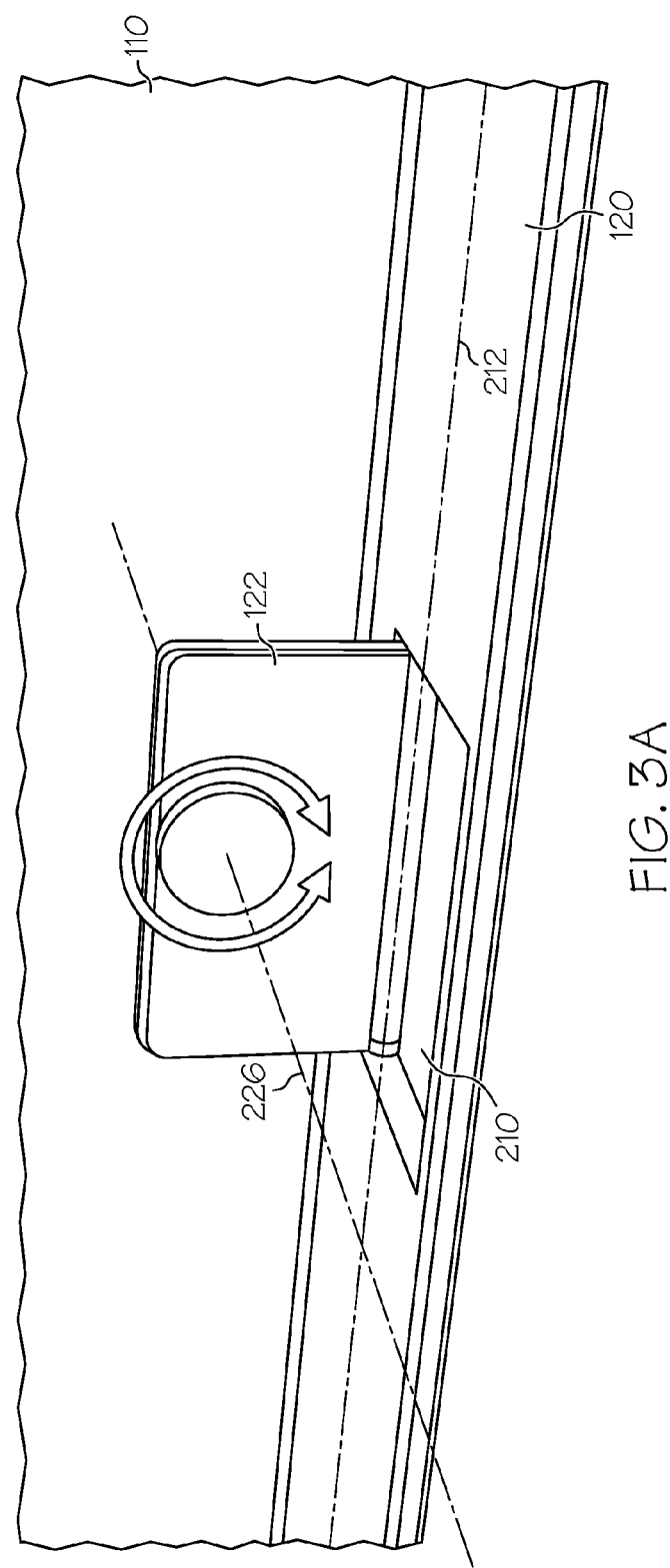

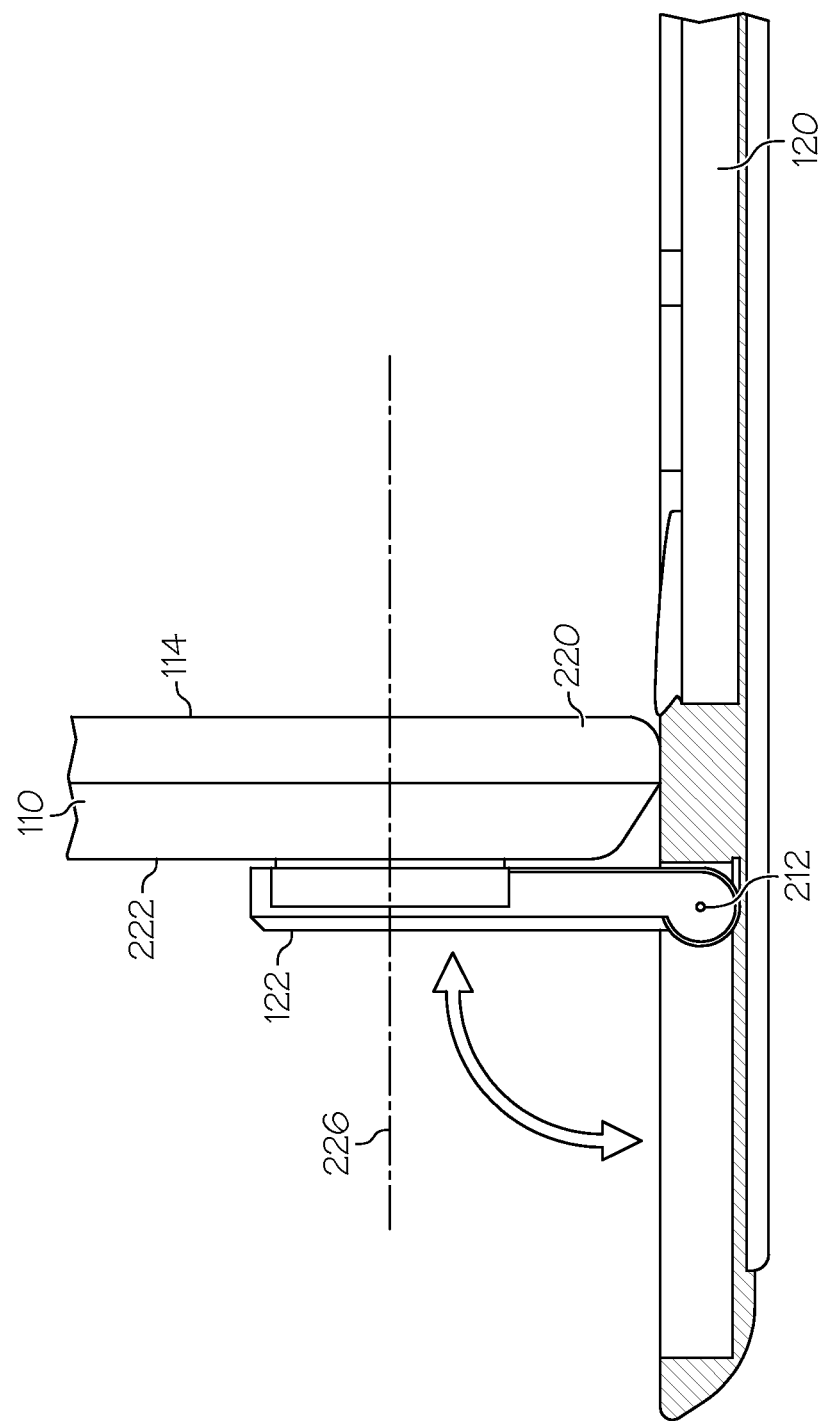

CONVERTIBLE TABLET

BACKGROUND OF THE INVENTION

The present invention relates generally to computer systems and, more specifically, to tablet computers with display screens which may tilt and swivel on two orthogonal axes.

In recent years, portable computers have evolved from transportable suitcase style computers, to laptops or notebooks, and then to slate PCs (also referred to as "tablets" or "pure tablets"). Tablet computers have many advantages not found in standard desktop or notebook computers. Chief among these advantages is usually the ability to interface with the tablet computer by writing on or tapping a touch screen display using a stylus or other implement. Input to the computer may thus be entered in a manner similar to writing on paper rather than using a keyboard.

The pure tablet computer provides great efficiency in note-taking environments or in a highly mobile environment where it is difficult to set up or use a keyboard and mouse to input data into the computer. Unfortunately, this advantage is also a great disadvantage because many users may still find that there is a great need and efficiency in using a keyboard for data entry. Even for existing convertible tablets which have keyboards, users may find they are thick and heavy. In addition, the hinge for the keyboard in existing convertible tablets is not firm, but wobbly.

Therefore, it can be seen that there is a need for a light weight tablet with a keyboard for easy data input.

SUMMARY

In one aspect, a computer system comprises a linking member having a first hinge and a second hinge; a display housing pivotally attached to the first hinge of the linking member; and an input unit pivotally attached to the second hinge of the linking member.

In another aspect, an electronic computing device comprises a lower housing; an upper housing pivotally connected to the lower housing, wherein the upper housing is movable over an angle of substantially 360° while the upper housing remains parallel to the lower housing, wherein the upper housing has a front cover and a back cover; and a linking member disposed to attach to the lower housing and the back cover of the upper housing.

In a further aspect, a mobile computing device comprises a lower housing; an upper housing pivotally coupled to the lower housing for movement between a tablet configuration and a laptop configuration, wherein, in the tablet configuration, the lower housing is substantially parallel and adjacent to the upper housing; and a linking member pivotally attached to the upper housing and the lower housing, wherein the lower housing has a slot adapted to receive the linking member.

These and other features, aspects and advantages of the present invention will become better understood with reference to the following drawings, description and claims.

BRIEF DESCRIPTION OF THE DRAWINGS

FIG. 1A is a perspective view of a tablet personal computer according to an exemplary embodiment in a tablet configuration;

FIG. 1B is a perspective view of a tablet personal computer according to an exemplary embodiment in a first exemplary position during movement between the tablet configuration and a laptop configuration;

FIG. 1C is a perspective view of a tablet personal computer according to an exemplary embodiment in a second exemplary position during movement between the tablet configuration and a laptop configuration;

FIG. 3A is a rear view of a tablet personal computer according to the exemplary embodiment of FIG. 1E; and FIG. 3B is a side view of a tablet personal computer according to the exemplary embodiment of FIG. 1E.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise a tablet PC with a keyboard. More specifically, exemplary embodiments of a tablet PC may comprise a linking member; an input unit, such as a keyboard; and a display housing. According to exemplary embodiments, a linking member, such as two hinges, may interconnect the input unit with the display housing. The tablet PC may be configured in either a laptop configuration or a tablet configuration. In a laptop configuration, the computing system may be used as a regular laptop either on one's lap or on a desk, for example. In a laptop configuration, the input unit may form an angle of between about 90° and 180° relative to the display housing with the linking member attached at the back of the display housing. In the tablet configuration, the display housing may be substantially parallel to and adjacent to the input unit of the computing system.

Referring to FIG. 1A-1B, a tablet personal computer (PC) 10 may include an upper housing 110, such as a display housing, and a lower housing 120, such as an input unit, for example, wherein the upper housing 110 and the lower housing 120 may be connected via a linking member 122, such as a double-hinged linking member. The tablet PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. Exemplary embodiments may include cell phones, smart phones, or electronic dictionaries, for example.

The notebook PC 10 may include a processor (not shown) within the lower housing 120. A liquid crystal display (LCD) 114, which may be a touch sensitive screen, for example, may be disposed in the upper housing 110. The touch sensitive screen 114 may be coupled to be operable by the processor to display data to a user of the notebook PC 10.

The upper housing 110 and the lower housing 120 may pivot around the linking member 122. The upper housing 110 may be rotatable through an angle of up to substantially 360° while remaining parallel to the lower housing 120.

Figure 1E:
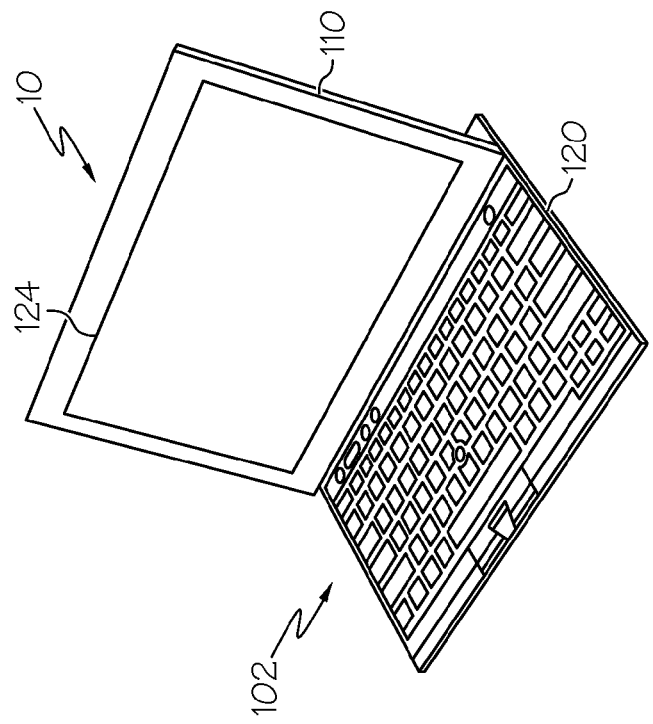
FIG. 1E is a perspective view of a tablet personal computer according to an exemplary embodiment in a laptop configuration

In operation of an exemplary embodiment, FIGS. 1A-1E show diagrams of the modes of operation for converting a tablet PC 10 from a tablet configuration (FIG. 1A) to a laptop configuration (FIG. 1E). The tablet PC 10 may change configurations in ways other than those shown in FIGS. 1A-1E, such as from a laptop configuration to a tablet configuration, for example.

When the tablet PC 10 is in the tablet configuration, as shown in mode of operation 101 of FIG. 1A, the upper housing 110 and the linking member 122 may form certain angles with the lower housing 120. The linking member 122 may be sandwiched between the upper housing 110 and the lower housing 120.

Users may use the tablet PC 10 in the tablet configuration 101 while sitting in a car, a train, a subway, or an airplane, for example. In the tablet configuration, the upper housing 110 may be substantially parallel and adjacent to the lower housing 120. Users may not see the linking member 122 in the tablet configuration because the linking member 122 is sandwiched between the upper housing 110 and the lower housing 120.

Figure 1D:
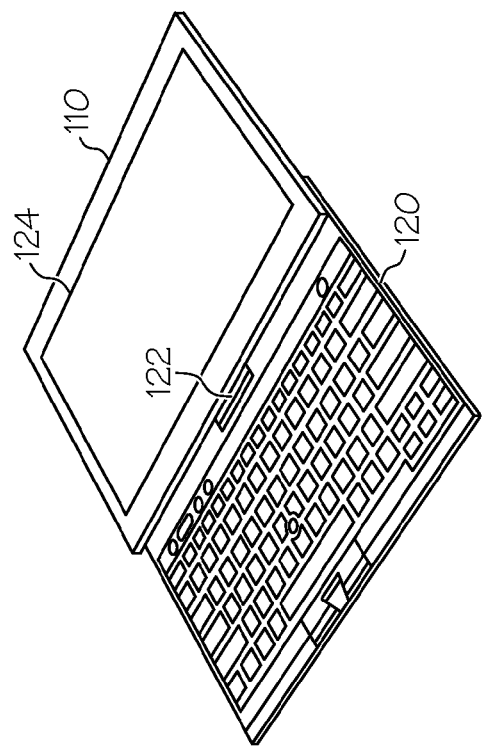
FIG. 1D is a perspective view of a tablet personal computer according to an exemplary embodiment in a third exemplary position during movement between the tablet configuration and a laptop configuration.

The upper housing 110 may rotate freely on the linking member 122 through an angle of up to substantially 360° angle while remaining parallel to the lower housing 120 as shown in FIGS. 1B-1D. One end 124 of the upper housing 110 (FIG. 1D) may rotate toward the lower housing 120 into a laptop configuration 102 as shown in FIG. 1E. In a laptop configuration of operation 102, users may sit in front of a desk with the tablet PC 10 on the desk or on their laps, for example.

Figure 2:
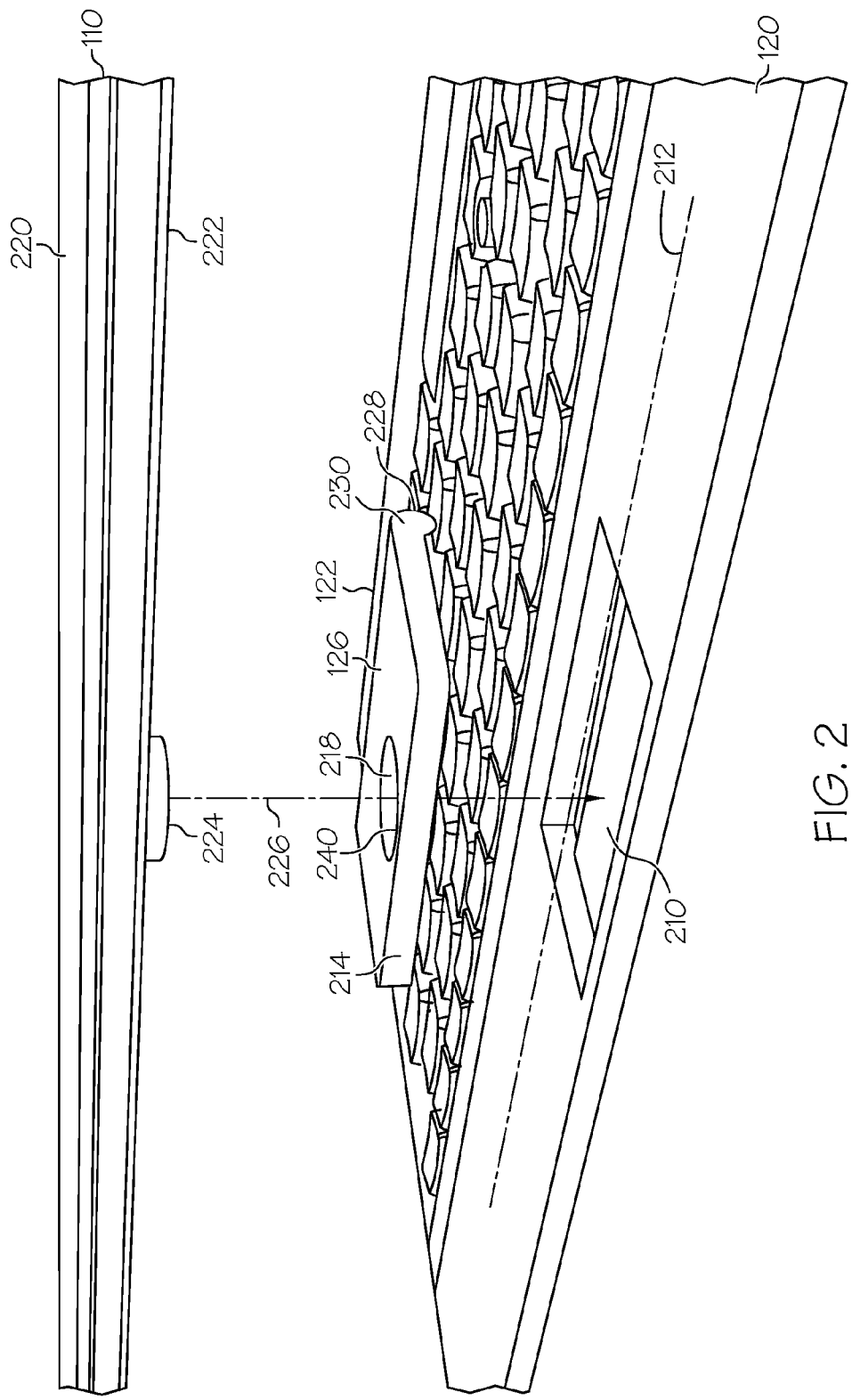
FIG. 2 is an exploded view of a tablet personal computer according to the exemplary embodiment of FIG. 1A.

Referring to FIG. 2, the upper housing 110 may include a front cover 220 and a back cover 222. The back cover 222 of the upper housing 110 may have a protrusion 224, such as a ring, which may be adapted to be inserted into a slot 218 of the linking member 122. The linking member 122 may have two hinges, such as a first hinge 230 and a second hinge 240. The first hinge 230 may be connected to the lower housing 120. The second hinge 240 may be connected to the upper housing 110. The linking member 122 may further include a slot 218 which is adapted to receive the protrusion 224 of the upper housing 110.

The linking member 122 may have a first end 126 and a second end 214. The first end 126 may have a round edge 228 to permit the second end 214 to rotate around the first hinge 230. The lower housing 120 may have a slot 210 adapted to receive the linking member 122.

The upper housing 110 may rotate around a pivot line 226 through an angle of up to a substantially 360° angle while remaining parallel to the lower housing 120 (also shown in FIG. 3A). The linking member 122 and the upper housing 110 may rotate around a pivot line 212 through an angle of up to substantially 90° relative to the lower housing 120 on the first axis line 212 (also shown in FIG. 3B). The linking member 122 may fit into the slot 210 when the linking member 122 and the upper housing 110 is folded toward the lower housing 120 as shown in FIG. 3B.

It should be understood, of course, that the foregoing relate to exemplary embodiments of the invention and that modifications may be made without departing from the spirit and scope of the invention as set forth in the following claims.

I claim:

1. A mobile computing device, comprising:
   a lower housing having an input surface with a user input device, a second hinge slot, the second hinge slot having a bottom wall with a recession;
   an upper housing having a back cover with a protrusion, and a front cover with a screen, the screen including a touch sensitive display; and
   a linking member having a first hinge slot, a first end having a rounded edge, a second end, top surface between the first end and the second end, and a bottom surface between the first end and the second end and opposite the top surface; and
   wherein the mobile computing device is in a tablet configuration when the linking member is inserted into the second hinge slot such that the linking member bottom surface lies against the bottom wall of the second hinge slot, the rounded edge lies within the recession, the protrusion is inserted into the first hinge slot, and the back cover of the upper housing lies against the input surface of the lower housing; and
   wherein the mobile computing device is in a laptop configuration when the linking member is inserted into the second hinge slot such that the linking member bottom surface is at an non-zero angle with the bottom wall of the second hinge slot, the rounded edge lies within the recession, and the protrusion is inserted into the first hinge slot.

2. The mobile computing device of claim 1, wherein the linking member comprises a first hinge and a second hinge.

3. The mobile computing device of claim 2, wherein the first hinge slot and the protrusion form the first hinge around a first hinge axis and the upper housing is rotatable through an angle of up to substantially 360° angle on the first hinge while the upper housing remains parallel to the lower housing.

4. The mobile computing device of claim 2, wherein the round edge and the recession form the second hinge around a second hinge axis, and the upper housing is rotatable through an angle of up to substantially 90° angle on the second hinge relative to the lower housing on the second hinge.

* * * * *